United States Patent [19]

Bradley

[11] 4,014,001

[45] Mar. 22, 1977

[54] ADDRESSABLE SIGNALLING APPARATUS HAVING MASTER CALLING FEATURE WITH OUTPUT LATCHES AND WRONG DIGIT REJECT

[75] Inventor: Donald A. Bradley, Milpitas, Calif.

[73] Assignee: Speedcall Corporation, Hayward, Calif.

[22] Filed: Dec. 22, 1975

[21] Appl. No.: 643,234

Related U.S. Application Data

[63] Continuation of Ser. No. 519,630, Oct. 31, 1974.

[52] U.S. Cl. .................. 340/147 MD; 340/168 R
[51] Int. Cl.² ........................................ H04Q 9/00
[58] Field of Search .... 340/147 MD, 147 P, 149 R, 340/164, 167, 163, 168, 311

[56] References Cited

UNITED STATES PATENTS

| 3,233,221 | 2/1966 | Perlin et al. | 340/168 R |
| 3,689,887 | 9/1972 | La Falce et al. | 340/163 |
| 3,801,742 | 4/1974 | O'Brien et al. | 340/168 R |

OTHER PUBLICATIONS

Speed Call Corp.—Bulletin, "An Advanced Design, Solid State Selective Signalling System Compatible with Contemporary Systems and Equipment Incorporating Multiple Frequency Dialing . . . ", 4 pp. c–101, 09–01–69 Speedcall Corp.
Speedcall Corp. Model 501 Publication, 24 pp.

Primary Examiner—Donald J. Yusko

[57] ABSTRACT

An addressable signalling apparatus wherein a shift register may be sequentially advanced through units of address by inputs to an OR gate. Such inputs may come from programmable connectors connected to selected input terminals defining a unique address or from one designated connector which is connected as an input to each of said OR gates defining an address unit substitute. The OR gates are connected in turn to a shift register which, when it sequentially shifts through programmed units of address, activates an output means. Once the output is enabled, a multiplicity of output messages may be transmitted through the apparatus.

The apparatus includes a logic circuit for resetting the shift means in the event an input not corresponding either to the programmed units of address or the common designated substitute address unit is received.

6 Claims, 2 Drawing Figures

ADDRESSABLE SIGNALLING APPARATUS HAVING MASTER CALLING FEATURE WITH OUTPUT LATCHES AND WRONG DIGIT REJECT

This is a continuation of application Ser. No. 519,630, filed Oct. 31, 1974.

BACKGROUND

A. Field of the Invention.

The invention relates to addressable signalling apparatus, and more particularly to an addressable signalling apparatus which may be addressed by a unique address or by an address in which a substitute common unit of address may be used to call a group of such addressable signalling apparatus.

B. Prior art.

Addressable signalling devices have been known for many years. For example, the modern telephone is a common example of such a signalling apparatus.

However, in many instances it is desirable to call a group of similar signalling devices. Previously, this could be achieved mainly by voice signalling.

An object of the invention is to provide a digital signalling apparatus which responds either to a unique address which is transmitted to the apparatus in sequence, or to a common substitute unit of address which permits group calling. A further feature of the invention is to provide such an apparatus which will reset itself if a wrong address unit is received in the sequence of address units being transmitted to the apparatus. Still a further object is to provide a digital signalling apparatus in which an address unit may form a portion of an output signal once the apparatus has been enabled by receipt of its unique address or an address substitute.

SUMMARY

The above objects are achieved with an addressable signalling apparatus which responds to either a unique digital address or to a digital address wherein address units have been substituted by a common unit of address which similarly enables the signalling apparatus for response. The apparatus has a plurality of input lines, each corresponding to one unit of address of a set of address units. Each of a number of programmable address connectors is connected to an input line terminal with such connections defining a selected address.

Each of a series of OR gates has a first input connected to different ones of said address connectors, while a second input of all OR gates is connected to a designated one of the address connectors. In this manner, each OR gate may be enabled by either an input from a unit of address as determined by the connection of said address connectors or by an input from the common unit of address in said designated address connector. The designated address connector is termed a "master call" address since it is common to all OR gates and enables each gate of every signalling apparatus with the same designated address connector.

An output signalling means, such as a lamp, series of lamps or audio alarm, may provide an appropriate message upon receipt of the apparatus of an address plus the message signals. Moreover, once an address or address substitute enables the output means, any unit of address may be transmitted through the apparatus as a portion of the output signal. A multi-cell shift means is connected to the output means and to the input lines for sequentially shifting through cells corresponding to sequential units of said programmable address upon receipt of a signal from an address connector. Upon receipt of each unit of address the shift means shifts to next cell. After receipt of a complete address, an output enabling cell of the shift means sends an enabling signal to the connected output means.

DESCRIPTION OF THE PREFERRED EMBODIMENT

Figure 1:
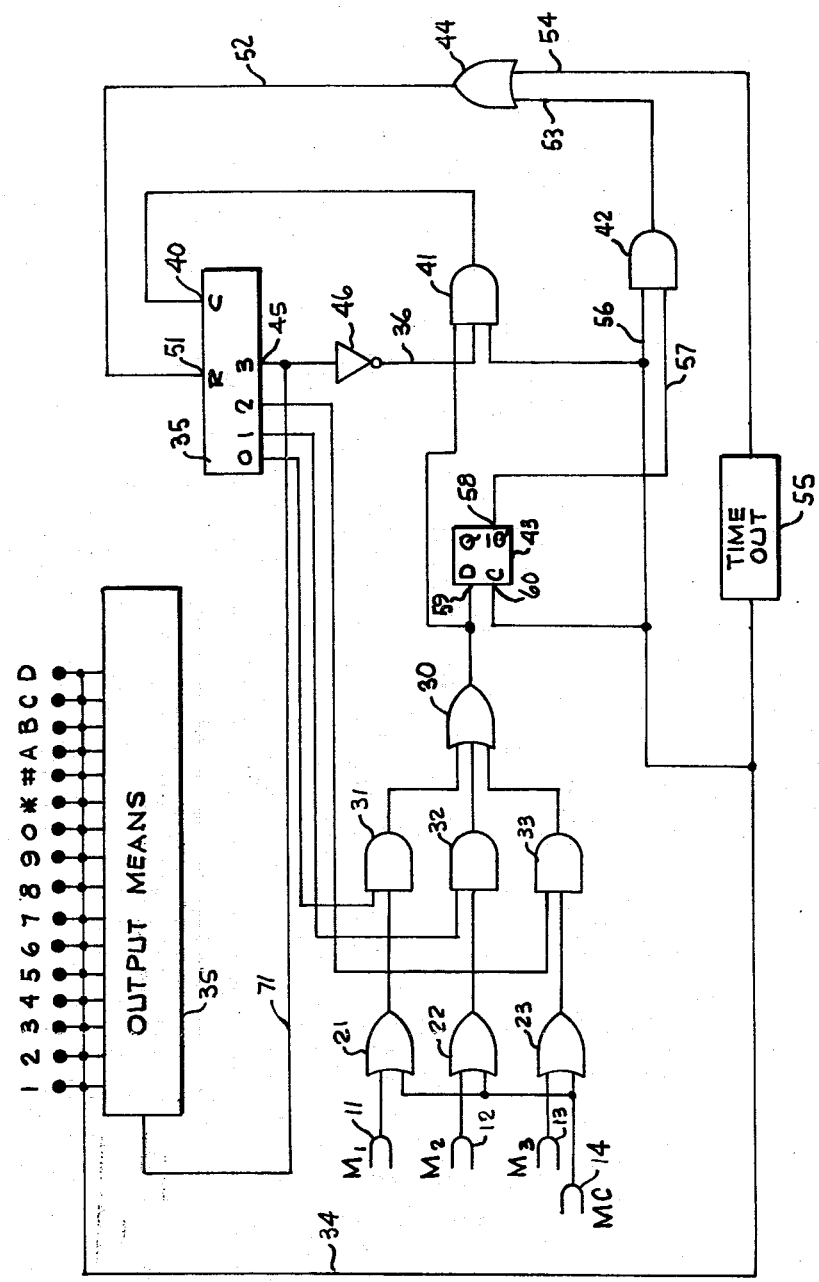
FIG. 1 is a simplified schematic of the apparatus.

With reference to FIG. 1, a series of input line terminals numbered 1, 2, 3, 4, 5, 6, 7, 8, 9, 0, *, #, A, B, C, D is seen in the figure. Each line terminal corresponds to one digital address unit of a set of address units, similar to the address units in a telephone number code. Each of the incoming line terminals includes a pin which may be engaged by a connector.

A series of address connectors 11, 12, 13, 14 is each connected to one of the pin terminals of the input lines. The last pin connector, 14, in FIG. 1 will be seen to be a common address unit, as explained below, whereas the connectors 11, 12, 13 define a unique address for the apparatus shown in FIG. 1, when such connectors are connected to the numbered or lettered terminals. For example, if connectors 11, 12 and 13 were connected to the pin terminals 2, 4 and 6, the signalling apparatus would respond to sequentially incoming signals on terminals 2, 4 and 6, thereby defining a unique address for the apparatus. Connector 14 is connected to a common unit of address which may be any, for example, the # terminal.

It will be seen that each of the programmable address connectors is an input for one of the OR gates 21, 22, 23. The common address connector 14 is connected as a second input to all the OR gates 21, 22, 23 and in this sense is a common address unit. The common input connector 14 is said to be a designated substitute address connector because it is connected to a terminal of an address unit which is designated to be common to all the OR gates.

It will be seen that the OR gates 21, 22 and 23 are connected to the shift means 35 indirectly through AND gates 31, 32 and 33. The shift means 35 is connected to output means 37 through line 71 and to the input lines and terminals through the line 34. Shift register 35 includes a clock means 40 connected to a first logic means principally comprising a first AND gate 41, and a flip-flop 43. Flip-flop 43 receives inputs from AND gates 31, 32 and 33. AND gate 41 receives inputs from a last stepping cell 45 of shift means 35 through line 36, as well as an input from flip-flop 43 and an input from the input terminals along line 34.

It will be realized that AND gate 41 will produce an output pulse upon receipt of information that any digit of address has been received and a unique or substitute address unit has been received by one of the OR gates 21, 22, 23 and that the shift means 35 has not advanced to its last stepping cell 45. The output of AND gate 41 will clock the shift means 35 to its next cell thereby producing a digital "high" transmitted to the next AND gate, one of gates 31, 32, 33, thereby enabling it upon receipt of its programmed address unit or a designated unit of address. Upon such receipt, AND gate 41 will again produce an output pulse until shift means 35 has reached its last stepping cell 45, at which time the pulse transmitted from cell 45 to AND gate 41 holds it in an off state thereby denying shift means 35 of further clocking pulses.

At the same time, as long as shift means 35 is held at its last stepping cell 45 in an output condition, the output means 35 is enabled through line 71. Cell 45 is thus an output means enabler. Once output means 37 has been enabled, any signal through an input terminal may be used as part of an output message to the called units.

The shift means 35 is reset by a reset means 51 which is connected to OR gate 44 by means of line 52. OR gate 44 receives an enabling pulse utilizing either line 53 or line 54, the latter being connected to a timing circuit 55 which in turn is connected to sense the presence of any digit in line 34. The timing circuit is reset each time an incoming pulse is sensed by the circuit. Thus, once the shift means 35 is being held with its output at the last stepping cell 45, the timing means 55 may reset the shift register to the first input cell if the interval between incoming digits to the input terminals exceeds a preselected period of time, normally 3 or 4 seconds. Thus, to keep the timing means 55 from resetting the shift means 35 some input digit should be transmitted through the input terminals to the apparatus.

OR gate 44 will also send a pulse to the reset means 51 for shift means 35 if it receives an input along line 53. Such an input may be received from the second AND gate 42. AND gate 42 receives inputs along lines 56, 57. The input along line 56 is the "any digit" input received along line 34 whenever there is an input signal to the input terminals of the apparatus. A second input is received along line 57 from flip-flop 43 at the $\overline{Q}$ output terminal 58 thereof. The output terminal 58 is activated with a digital "low" whenever the D terminal 59 of flip-flop 43 receives an input from one of the AND gates 31, 32, 33. Thus, no output pulse will be produced in AND gate 42 when any of the unique programmed address digits is received or a substitute. However, the AND gate 42 will be enabled if a wrong digit is activated since the wrong digit will cause a pulse in line 34 which will cause clocking of flip-flop 43 at terminal 60, which will in turn produce a digital high at terminals 58 and line 57, which, together with a similar high along line 56, will enable the AND gate 42. The pulse generated by AND gate 42 is relayed by the OR gate 44 to the reset means 51 and stepping means 35 is returned to its initial input state. The logic circuit described for enabling the resetting means 51 through AND gate 42 is known as the wrong digit reject feature of the present apparatus.

Figure 2:
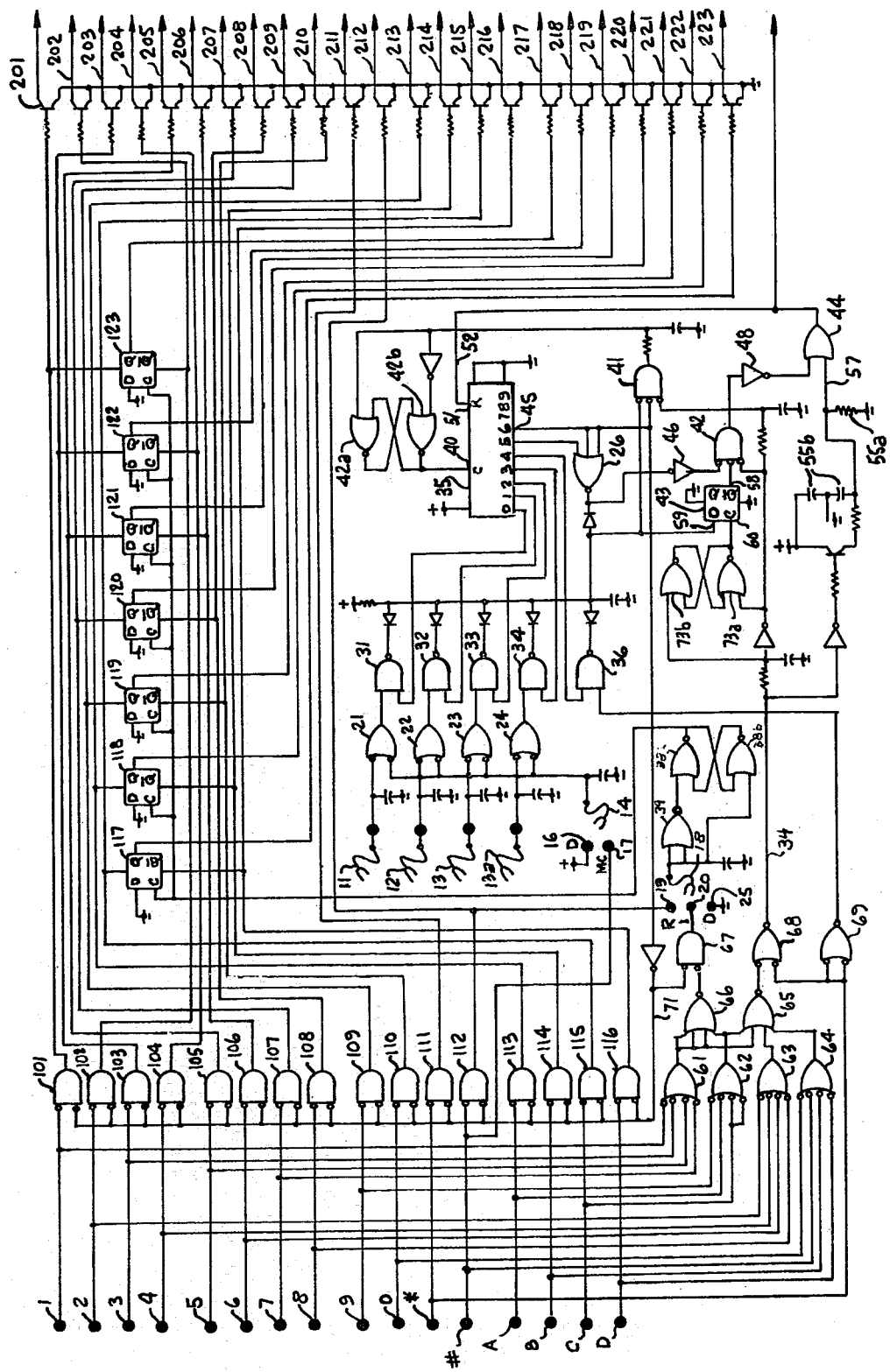
FIG. 2 is a complete schematic of the apparatus of the present invention.

FIG. 2 shows a more detailed view of the present invention. Input terminals are numbered 1, 2, 3, 4, 5 6, 7, 8, 9, 0, *, # , A, B, C, D. The input terminals receive digital address information from signal selectors or decoders which demodulate encoded signal information which may arrive by radio or wire line. An example of one type of selector is described in U.S. Pat. No. 3,128,349.

It will be seen that the input terminals are connected both to the AND gates 101-106 and to OR gates 61, 62, 63, 64 and ultimately to OR gate 68, the output of which is taken along line 34 and designates receipt of any digit. The AND gates 101-116 are a part of an output means 37 shown in FIG. 1. These AND gates are enabled by a signal along line 71 derived from the shift means 35, when it is shifted to its last stepping cell 45.

The output means 37 of FIG. 1 will be described in more detail below.

Connectors 11, 12, 13, 13a and 14 are seen to be adapted for connection to any of the input terminals 1, 2, 3, 4, 5, 6, 7, 8, 9, 0, *, # , A, B, C, D. Each of the connectors 11, 12, 13, 13a is connected to an input of a respective OR gate 21, 22, 23, 24. A second input for each of these OR gates is derived from a connector 14 which is connected to a terminal 17, which in turn is connected to one of the input terminals, in FIG. 2 the # terminal. Terminal 17 is known as the "master call" terminal since it will provide a substitute address to the unique addresses which are programmed by connection of connectors 11, 12, 13, 13a to selected ones of said input terminals.

Either selected address units arriving at the input terminals which are connected to the connectors 11, 12, 13, 13a or a master call input, # , will activate respective OR gates 21-24 which in turn transmit signals to the connected AND gates 31, 32, 33, 33a. However, a signal will not be passed through an AND gate until a second input is derived by each AND gate from the stepping means 35. Stepping means 35 activates an AND gate when a respective stepping cell of the stepping means is in a high state. When this occurs, one of AND gates 31, 32, 33, 33a transmits a signal to D terminal 59 of flip-flop 43. Simultaneously, a signal derived from any of the input terminals will be transmitted along line 34 and be gated through the pulse shaping gates 73a, 73b to clock terminal 60 of flip-flop 43 thereby producing an output at the $\overline{Q}$ terminal 58 of flip-flop 43. This output is taken directly to the reset enabling AND gate 42, which also receives an input from the previously mentioned line 34. AND gate 42 transmits a signal to OR gate 44 which is connected to the reset terminal 51 of the stepping means 35. Thus, the AND gate 42 forms a logic means which produces an output reset pulse when any digit enters the apparatus, but is not an address unit, i.e. a wrong address digit. As explained below once the stepping means 35 reaches its last cell, further pulses will not produce a reset condition, except as explained in the next paragraph and thereafter.

As previously explained with reference to FIG. 1, the OR gate 44 is also responsive to a timing means 55a, 55b, which form a RC timing means which generates a pulse in a preselected period of time if the capacitors 55b are not recharged by receipt of another pulse from line 34. In other words, if the interval between incoming pulses on line 34 is too long, the RC network 55a, 55b will generate a pulse which will be transmitted through the OR gate 44 to the resetting means 51 of shift means 35 thereby causing the shift means to recycle to its lowest or initial state awaiting an address unit at connector 11.

It will be seen that any digit clocks flip-flop 43 into AND gate 42 but AND gate 42 only produces a pulse to the OR gate 44 when any digit other than a programmed or substitute address digit is received except when the shift means 35 has stepped to the last stepping cell 45. Once the shift means 35 has been clocked to its last stepping cell 45, a signal is transmitted to the AND gate 41 which has also derived inputs from any address connector 11-14 and from the any digit line 34. However, the signal received from the last stepping cell 45 is of the opposite polarity to the remaining signals received at the AND gate 41 thereby holding off further clocking of the shift means 35. The AND gate 41 may be referred to as a clocking hold-off means for the shift means 35.

At this point, the AND gates 101–116 have been enabled by a signal in the last stepping cell 45, as previously described, and further inputs for AND gates 101–116 may be received through the input terminals 1, 2, ... C, D. If no further inputs are received prior to the preselected time mentioned previously, the timing means 55a, 55b will cause the shift means to reset. However, inputs along the aforementioned input terminals may now pass through the respectively connected AND gates 101–116 to respectively connected output drivers 201–216.

A first group of input terminals is connected through respective AND gates to the "set" terminal of one of the latch flip-flops 117–123. In FIG. 2, the odd numbered incoming terminals plus terminals A, C are connected to respective set terminals, while even numbered input terminals plus terminals B, D, forming a second terminal group, are connected to the "reset" terminals of the same flip-flops. It will be seen that the flip-flops 117–123 are connected to the special latch output drivers 217–223. These outputs remain driven as long as the respectively connected flip-flops remain in the same output state. Any impulse to the reset terminal of a flip-flop will cause that flip-flop to change state thereby dropping the output latched condition from a respective output latch driver.

The flip-flops 117–123 may also change state by a signal derived from the pulse shapers 38a, 38b connected to OR gate 39 which is in turn connected through connector 18 to either of the terminals 19, 20 or 25. If connector 18 is connected to terminal 19 a clocking pulse will be delivered to each flip-flop whenever the # terminal is activated, thereby resetting all flip-flop latches 117–123. If connector 18 is connected to terminal 20 only receipt of signals from selected input terminals, i.e. odd numbered terminals, will generate a signal at terminal 20 thereby clocking the flip-flops to a reset state. However, it will be recalled that the odd terminals also set the flip-flops. The signal through the shaping network 38a, 38b will reset all flip-flops except the one which is presently being activated by a signal from a connected input terminal. Since this input signal at the set terminal will override the clocking signal in the one connected flip-flop, such that all flip-flops will be reset except the one connected to the odd numbered input terminal which is presently receiving an input signal. This occurs only when connector 18 is connected to terminal 20. If connector 18 is connected to ground terminal 25, latches 117–123 may only be reset by the second or reset group of input terminals.

All output drivers 201–223 are shown to be transistors, but only the latched output drivers 217–223 remain on longer than the input pulse duration at input terminals 1, 2, 3, ... C, D. The output drivers 201–223 may be connected to any further output device such as a lamp, horn or the like. The AND gates 101–116, the flip-flop latches 117–123 and the output drivers 201–223 in FIG. 2 all form portions of the output means 37 of FIG. 1.

I claim:

1. An addressable signalling apparatus in a group of similar apparatus having a multiple unit address comprising,
   a plurality of input terminals, each terminal corresponding to one address unit of a set of address units,
   programmable address connectors, each address connector connected to one of said input terminals in a preselected address program,
   a series of OR gates, having inputs and an output, each of said OR gates having as one input different ones of said address connectors representing unique units of address and all of said OR gates having a second input a designated one of said address connectors representing a substituted unit of address,
   an output means for signalling,
   a multi-cell shift means connected to said output means, to said OR gates and to said input terminals, for sequentially shifting through cells corresponding to sequential units of said programmable address upon receipt of a signal from an address connector, said shift means having an output means enabling cell connected for enabling said output means upon receipt of sequential units of address from said address connectors whereby all addressable signalling apparatus in said group having common units of address apart from said substituted unit of address may be signalled, and reset means within said shift means, said reset means connected to a first logic means for enabling said reset means when a signal other than a signal in one of said address connectors is transmitted to the apparatus.

2. The apparatus of claim 1 further including hold off circuit means connected to said multi-cell shift means and to the last address cell of said shift means for stopping shifting of said shift means when said last address cell is enabled.

3. The apparatus of claim 1 further defined by a timing means connected to said reset means and to said input terminals, said timing means having circuit means for generating a reset pulse at a preselected time interval between pulses at said input terminals.

4. The apparatus of claim 1 further defined by a plurality of latch means connected to said output means for holding at least a portion of said output means in an output state.

5. The apparatus of claim 4 wherein each of said latch means includes latch setting means connected to a first group of selected input terminals.

6. The apparatus of claim 4 wherein each of said latch means includes latch resetting means connected to a second group of selected input terminals.

* * * * *